United States Patent
Ohran et al.

(10) Patent No.: US 6,338,126 B1
(45) Date of Patent: Jan. 8, 2002

(54) CRASH RECOVERY WITHOUT COMPLETE REMIRROR

(75) Inventors: Richard Ohran, Provo; Dan Price, Orem; Randall Johnson, Pleasant Grove, all of UT (US)

(73) Assignee: Legato Systems, Inc., Mountain View, CA (US)

( * ) Notice: Subject to any disclaimer, the term of this patent is extended or adjusted under 35 U.S.C. 154(b) by 0 days.

(21) Appl. No.: 09/455,072

(22) Filed: Dec. 6, 1999

(51) Int. Cl.[7] ............................................... G06F 12/16
(52) U.S. Cl. ....................... 711/162; 707/204; 709/213; 714/6
(58) Field of Search ................................ 711/161, 162; 714/6; 707/204; 709/213

(56) References Cited

U.S. PATENT DOCUMENTS

| | | | |
|---|---|---|---|
| 4,342,079 A | 7/1982 | Stewart et al. | 364/200 |
| 5,155,845 A | 10/1992 | Beal et al. | 395/575 |
| 5,212,784 A | 5/1993 | Sparks | 395/575 |
| 5,649,152 A | 7/1997 | Ohran et al. | 395/441 |
| 5,764,903 A | 6/1998 | Yu | 395/200.38 |
| 5,812,748 A | 9/1998 | Ohran et al. | 395/182.02 |
| 5,835,953 A | 11/1998 | Ohran | 711/162 |
| 5,907,673 A | 5/1999 | Hirayama | 395/182.14 |
| 5,978,565 A | 11/1999 | Ohran et al. | 395/182.11 |

*Primary Examiner*—Hiep T. Nguyen
(74) *Attorney, Agent, or Firm*—Workman, Nydegger & Seeley

(57) ABSTRACT

A primary computer system and a backup computer system each have an associated memory. For each write request, a copy of the request is forwarded to a delay buffer and memory queue associated with the primary computer system, and a copy is forwarded to a memory queue of the backup computer system. The backup computer system transmits an acknowledgement signal to the primary computer system when the backup computer system receives its copy of the request. The write request in the delay buffer of the primary computer system is executed in the primary memory only upon receipt of this acknowledgement signal. Thus, the backup computer system knows of every request executed in the primary memory. The write request is executed in the backup memory at any time after the backup computer system receives the write request. The write requests are deleted from the memory queues (primary and backup) when the associated computer system confirms that the write request was executed in the memory of the opposite computer system. Should the primary (or backup) computer system shut down, the requests are accumulated in the opposite backup (or primary) memory queue. When the primary (or backup) computer system becomes operational again, the requests in the opposite backup (or primary) memory queue are executed in the primary (or backup) memory. Thus, no memory is lost when the primary (or backup) computer system shuts down and complete remirroring of data is not required.

31 Claims, 4 Drawing Sheets

CRASH RECOVERY WITHOUT COMPLETE REMIRROR

BACKGROUND OF THE INVENTION

1. The Field of the Invention

The present invention relates to data storage associated with computers and data processing systems. Specifically, the present invention relates to methods used to recover from a computer failure in a system having a plurality of computer systems, each with its own mass storage device.

2. The Prior State of the Art

Computer networks have greatly enhanced mankind's ability to process and exchange data. Unfortunately, on occasion, computers partially or completely lose the ability to function properly in what is termed a "crash" or "failure". Computer failures may have numerous causes such as power loss, computer component damage, computer component disconnect, software failure, or interrupt conflict. Such computer failures can be quite costly as computers have become an integral part of most business operations. In some instances, computers have become such an integral part of business that when the computers crash, business operation cannot be conducted.

Almost all larger businesses rely on computer networks to store, manipulate, and display information that is constantly subject to change. The success or failure of an important transaction may turn on the availability of information which is both accurate and current. In certain cases, the credibility of the service provider, or its very existence, depends on the reliability of the information maintained on a computer network. Accordingly, businesses worldwide recognize the commercial value of their data and are seeking reliable, cost-effective ways to protect the information stored on their computer networks. In the United States, federal banking regulations also require that banks take steps to protect critical data.

One system for protecting this critical data is a data mirroring system. Specifically, the mass memory of a secondary backup computer system is made to mirror the mass memory of the primary computer system. Write requests executed in the primary mass memory device are transmitted also to the backup computer system for execution in the backup mass memory device. Thus, under ideal circumstances, if the primary computer system crashes, the backup computer system may begin operation and be connected to the user through the network. Thus, the user has access to the same files through the backup computer system on the backup mass memory device as the user had through the primary computer system.

However, the primary computer system might crash after a write request is executed on the primary mass memory device, but before the request is fully transmitted to the backup computer system. In this case, a write request has been executed on the primary mass memory device without being executed on the backup mass memory device. Thus, synchronization between the primary and backup mass memory devices is lost. In other words, the primary and backup mass memory devices are not perfectly mirrored, but are slightly different at the time of the crash.

To illustrate the impact of this loss in synchronization, assume that the primary and backup mass memory devices store identical bank account balances. Subsequently, a customer deposits money into an account and then shortly thereafter changes his mind and withdraws the money back from the account. The primary computer system crashes just after the account balance in the primary mass memory device is altered to reflect the deposit, but before the write request reflecting the deposit is transferred to the backup computer system. Thus, the account balance in the backup mass memory device does not reflect the deposit. When the customer changes his mind and withdraws the money back out from the account, the account balance in the backup memory device is altered to reflect the withdrawal. When the primary computer system is brought back into operation, the account balance from the backup mass memory device is written over the account balance in the primary mass memory device. Thus, the account balance reflects the withdrawal, but does not reflect the deposit.

Another disadvantage of this system is that when that primary computer system is brought back into operation, the entire backup mass storage device is copied back to the primary mass storage device in what is termed a "remirror". The copying of such large amounts of data can occupy a significant time and be disruptive to transactional operations.

Therefore, a backup computer system and method are desired that do not result in the above-described loss of synchronization, and that do not require a complete remirror.

SUMMARY OF THE INVENTION

In accordance with the present invention, a method and system are provided in which data from a primary computer system is mirrored in a secondary backup computer system. This system maintains complete synchronization between the primary and backup memory devices even should the primary computer system fail after a write request was executed in the memory of the primary computer system, but before the request is fully transmitted to the backup computer system.

For each write request, a copy of the request is written into a delay buffer associated with the primary computer system, and a copy is transmitted to the backup computer system. After the write request has been fully transmitted to the backup computer system, the backup computer system informs the primary computer system (e.g., by sending an acknowledgement signal) that the request has been received at the backup computer system. The write request in the delay buffer of the primary computer system is executed only after the primary computer system receives the acknowledgement signal indicating that the backup computer system also received a copy of the write request. Thus, if the primary computer system fails before a copy of the write request is transmitted to the backup computer system, the primary computer system will not have executed the write request since the write request was left unexecuted in the delay buffer. Therefore, synchronization is not lost between the primary and backup computer systems.

Another advantage of this invention is that complete remirroring (i.e., recopying) of data from the backup computer system to the primary computer system is not needed when the primary computer system is brought back into operation after a failure. Both the primary and backup computer systems have a memory queue to which a copy of the write request is forwarded. When the primary computer system determines that the write request has been executed in the memory device of the backup computer system, the primary computer system deletes that request from its memory queue. Likewise, when the backup computer system determines that the primary computer system has executed the write request, the backup computer system deletes the write request from its memory queue. Thus, the memory queue includes write requests which have been generated, but which are not confirmed to have been executed by the opposite computer system.

Should the opposite computer system experience a failure, the memory queue will accumulate all the write requests that need to be executed within the failed computer system to once again mirror the memory of the operational computer system. Only the write requests in the memory queue, rather than the entire memory, are forwarded to the failed computer system once it becomes operational. Thus, complete remirroring is avoided.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
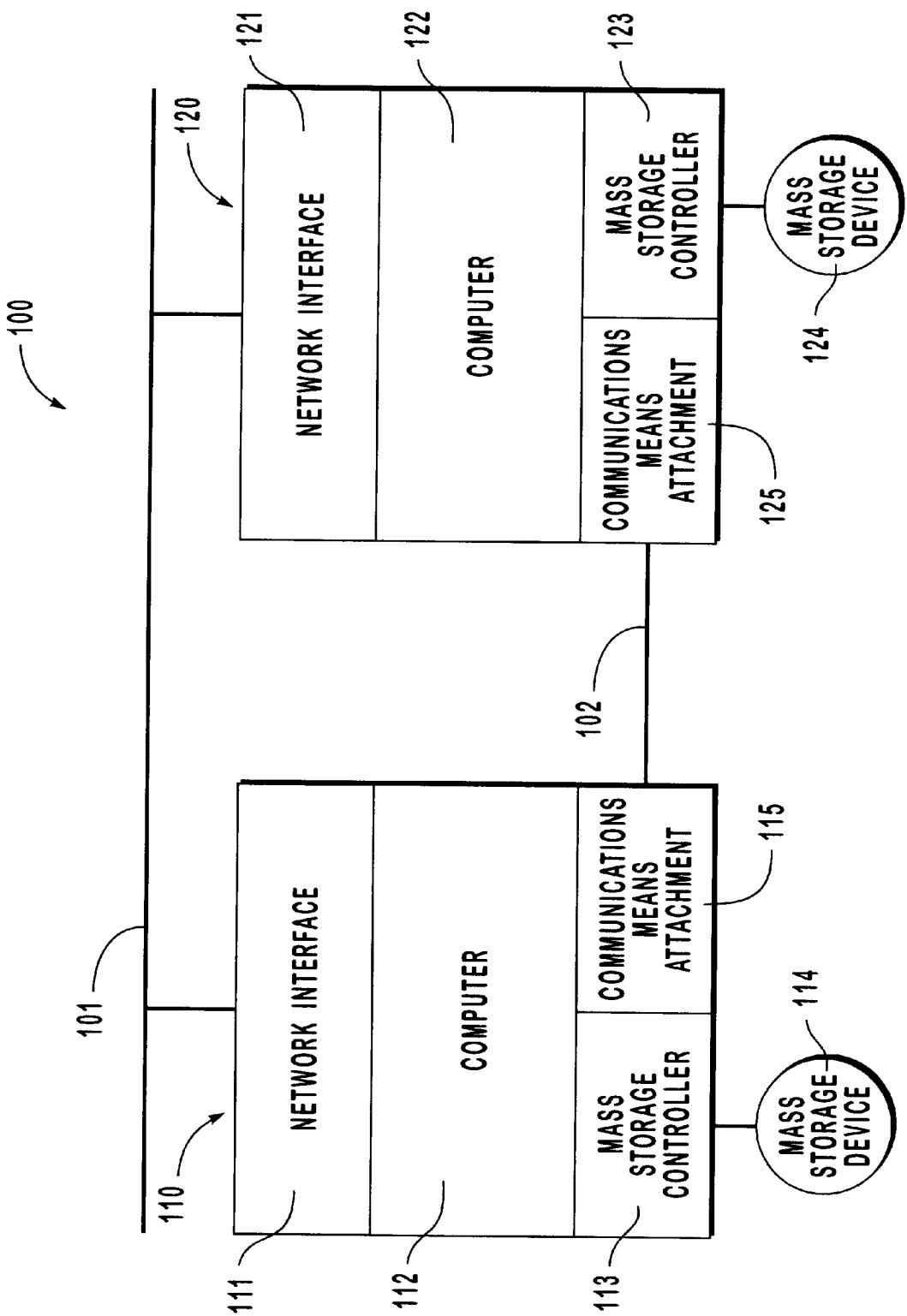
FIG. 1 is a schematic drawing of a network configuration that represents a suitable operating environment for the invention.

FIG. 1 is a schematic diagram of a computer configuration 100 that represents a suitable operating environment for the invention. The configuration 100 includes two computer systems 110, 120, both running a computer server operating system such as Novell NetWare®. The backup computer system 120 monitors the primary computer system 110 to verify that the primary computer system 110 is operational. Should the primary computer system 110 cease to operate, the backup computer system 120 takes over operations.

The primary computer system 110 includes a computer 112 connected to a network 101 through an interface 111 and its associated software. The computer 112 is connected to a mass storage device 114 through a mass storage controller 113 and its associated software. In the case of Novell NetWare®, the computer 112 may be a standard PC-compatible computer, the network 101 may be an Ethernet, and the mass storage device 114 may be a SCSI or IDE magnetic disk. The network interface 111 may be an Ethernet network interface and the mass storage controller 113 may be a SCSI or IDE magnetic disk controller. Network 101 could also be implemented using a token ring, Arcnet, or any other network technology.

The backup computer system 120 has components which can be similar to computer system 110. For example, a computer 122 can be connected to the network 101 through a network interface 121, although it is not necessary for computer 122 to be connected to the network 101 as long as there is available some means for communication between the computers 112 and 122. Computer 122 is connected to a backup mass storage device 124 through a mass storage controller 123.

While it is not necessary for the computer system 120 to have identical components to the computer system 110, many times that will be the case. In other cases, the computer system 120 may be an older, slower system previously used as a filer server but replaced with the computer system 110. All that is required of computer system 120 is that it be capable of running the file server operating system in case of the failure of computer system 110, and that its mass memory 124 be of sufficient capacity to hold that data mirrored from the mass storage device 114. In this description and in the claims, "primary" means associated with the primary computer system 110, and "backup" means associated with the backup computer system 120. The term "backup" is used herein to conveniently distinguish certain elements and components from "primary" components, and does not necessarily require full, traditional backup capabilities other than those specifically enumerated herein. Indeed, in one embodiment, the primary computer system 110 and the backup computer system 120 can be interchangeable, in that backup computer system 120 can be used as desired to provide network services to network 101 and can exhibit the functionality described herein in reference to primary computer system, and vice versa.

U.S. application Ser. No. 08/848.139, entitled "Method for Rapid Recovery From a Network File Server Failure Including Method for Operating Co-Standby Servers," filed Apr. 28, 1997, is incorporated herein by reference and discloses components that correspond generally to those of FIG. 1 of the present application, and which can be adapted as taught herein to perform the functionality and operations associated with the present invention.

The primary and backup mass storage devices 114, 124 of the invention may include any mass memory capable of handling the read and write requests of the computer systems 110, 120. Such memories may include optical disks, magnetic tape drives, magnetic disk drives, and the like.

A communication means 102 provides a link between the primary computer system 110 and the backup computer system 120. Primary computer 112 is connected to the communication means 102 through a primary communication means attachment 115, and the backup computer 122 is connected to the communication means 102 through a backup communication means attachment 125. Communication means 102 can be implemented using a variety of techniques, well known to those skilled in the art. In one embodiment, a high-speed serial point-to-point link is used. Alternatively, the serial communication ports of the computers 112, 122 are used after being programmed to run at a high data rate. As another alternative, the parallel ports of the computers 112, 122 are used.

The communication means 102 provides data transfer at rates comparable to the data transfer rate of the mass storage device 124 so that the communication means 102 does not limit the performance of the configuration 100. The method of this invention is not dependent on the particular implementation of the communication means 102, although a communication means 102 dedicated only to the method of the invention will generally result in more efficient operation and simpler programs.

Figure 2:
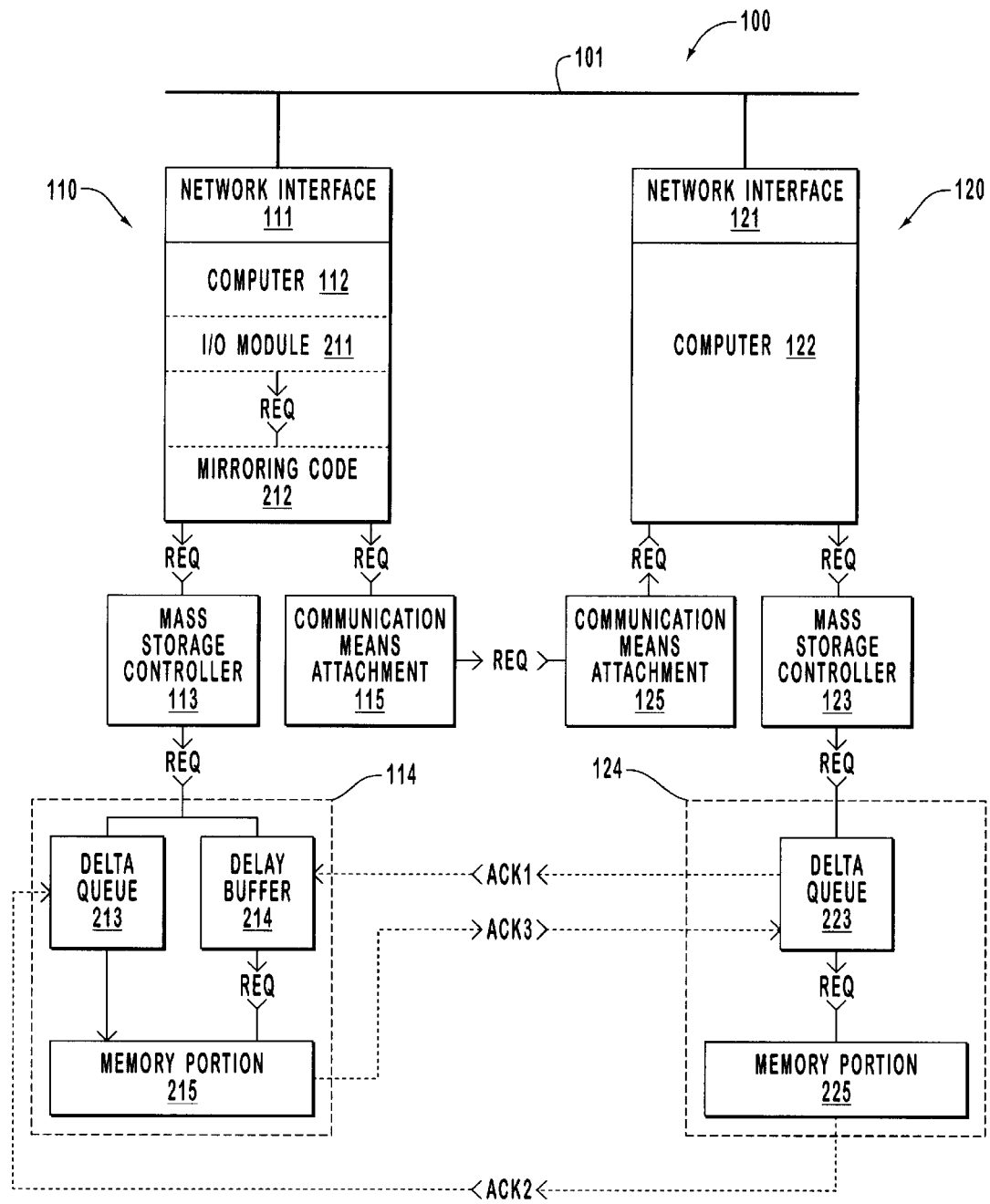
FIG. 2 is a more detailed drawing of the network configuration of FIG. 1.

FIG. 2 shows a more detailed schematic diagram of the configuration 100 of FIG. 1 in which the primary computer 112 includes an I/O module 211 and mirroring code 212. The primary mass storage device 114 includes a delta queue 213, a delay buffer 214, and a memory portion 215; and the backup mass storage device 124 includes a delta queue 223 and a memory portion 225. The interrelationship of these components may best be understood by describing the operation of the network configuration 100.

A read operation is performed by the primary computer 112 issuing a read request through the primary mass storage controller 113 to the primary mass storage device 114. The corresponding data is transmitted from the primary mass storage device 114 to the primary computer 112. If the backup computer system 120 is operating instead, the backup computer 122 issues a read request through the backup mass storage controller 123 to the backup mass storage device 124.

Figure 3:
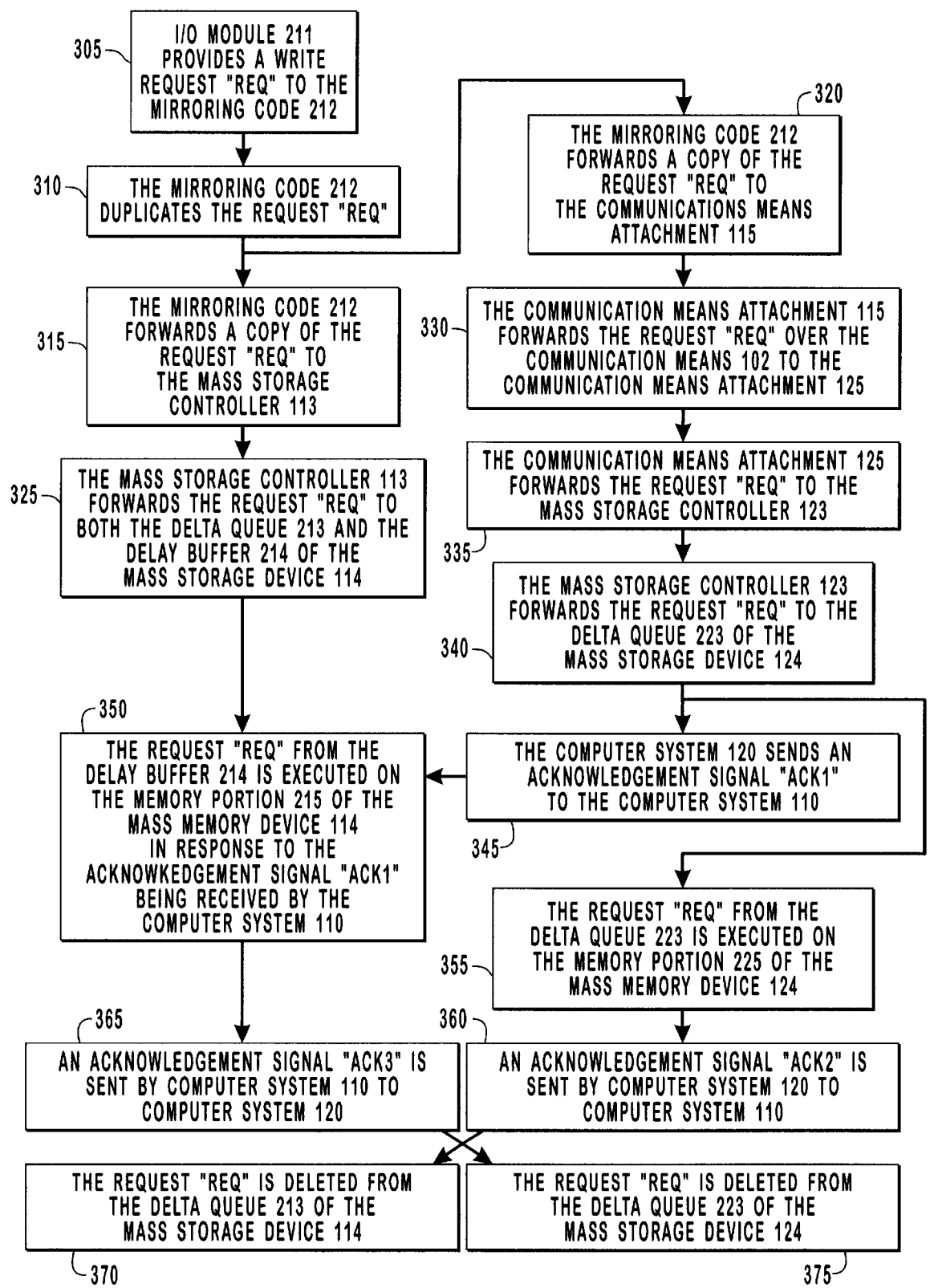
FIG. 3 is a flowchart of a method for synchronizing the primary and backup mass memory devices of FIGS. 1 and 2.

A write operation in accordance with the invention may be performed as shown in the flow chart of FIG. 3. In this description and in the claims, a write operation (or request) includes any operation (or request) that alters mass memory such as a write, delete, destructive read, or initialization.

A method in accordance with the invention will now be described in detail with respect to FIGS. 2 and 3. First, the I/O module 211 of the primary computer 112 provides a write request REQ to the mirroring code 212 (step 305 of FIG. 3). The mirroring code 212 then duplicates the request REQ (step 310) and causes a copy of the request REQ to be forwarded to the primary mass storage controller 113 (step 315). The mirroring code 212 also causes another copy of the request REQ to be forwarded to the primary communication means attachment 115 (step 320). Each copy is to be executed on the corresponding mass storage device 114, 124 so that mass storage devices 114, 124 are synchronized.

The primary mass storage controller 113 writes the request REQ to the primary delta queue 213 of the primary mass storage device 114 (step 325). The primary delta queue 213 includes requests that are not confirmed by the primary computer system 110 to have been executed in the backup computer system 120. If the primary computer system 110 receives confirmation or learns by other means that the request was executed in the backup mass storage device 124, the request is deleted from the primary delta queue 213 of the primary mass storage device 114 as described further below. The primary mass storage controller 113 also writes the request REQ to the delay buffer 214 of the primary mass storage device 114 (also step 325).

A copy of the request REQ is forwarded from the primary communication means attachment 115 over the communication means 102 to the backup communication means attachment 125 (step 330). The request REQ is then forwarded from the backup communication means attachment 125 through the backup mass storage controller 123 (step 335) and to the backup delta queue 223 (step 340). The delta queue 223 includes requests that are not confirmed by the backup computer system 120 to have been executed in the primary computer system 110. If the backup computer system 120 receives confirmation or learns by other means that the request was executed in the primary mass storage device 114, the request is deleted from the backup delta queue 223.

As soon as the request REQ is received in the backup delta queue 223, the backup computer system 120 sends an acknowledgement signal ACK1 back to the delay buffer 214 in the primary mass storage device 114 (step 345). Thus, the acknowledgement signal ACK1 indicates that the backup computer system 120 has properly received the write request REQ. Upon receipt of the acknowledgement signal ACK1, the primary computer system 110 executes the request REQ stored in the delay buffer 214 by performing the associated operation in the memory portion 215 of the primary mass storage device 114 (step 350). Thus, the primary computer system 110 does not execute a write request until it has confirmation that the backup computer system 120 has received a copy of the write request. Hence, there are no synchronization problems caused a primary computer system 110 failure after the write request REQ has been executed in the primary mass storage device 114, but before a copy of the write request REQ has been fully transmitted to the backup computer system 120.

Also after a copy of the request REQ is sent to the backup delta queue 223 (step 340), the request REQ is executed in the memory portion 225 of the backup mass storage device 124 (step 355). Another acknowledgement signal ACK2 is then transmitted from the backup computer system 120 to the primary computer system 110 (step 365) indicating that the copy of the write request REQ has been executed by the backup computer system 120. Once the primary computer system 110 receives the second acknowledgement signal ACK2 (step 360), the primary computer system 110 deletes the request REQ from the primary delta queue 213 (step 370). The primary delta queue 213 thus includes all requests that have been sent to the primary mass storage device 114 for execution, but which are not confirmed to have been executed in the backup mass storage device 124.

During normal operation of the backup computer system 120, write requests in the primary delta queue 213 are steadily deleted as the write requests are executed in the backup mass storage device 124. Should the backup computer system 110 shut down such that the stream of write requests is no longer being executed in the backup mass storage device 124, the write requests will accumulate in the primary delta queue 213. When the backup computer system 120 becomes operational again, the accumulated write requests in the primary delta queue 213 are transmitted to the backup computer system 120 for execution to bring the backup mass storage device 124 back into synchronization with the primary mass storage device 114.

After the request REQ is executed in the primary main memory 215 (step 350), a third acknowledgement signal ACK3 is transmitted from the primary computer system 110 to the backup computer system 120 (step 365) indicating that the request REQ has been executed by the primary computer system 110. The request REQ is then deleted from the backup delta queue 223. The backup delta queue 223 thus includes all requests that have been sent to the backup mass storage device 124 for execution, but which are not confirmed to have been executed in the primary mass storage device 114.

During normal operation of the primary computer system 110, write requests in the backup delta queue 223 are steadily deleted as the write requests are executed in the primary mass storage device 114. Should the primary computer system 110 shut down such that the stream of write requests are no longer being executed in the primary mass storage device 114, the write requests will accumulate in the backup delta queue 223. When the primary computer system 110 becomes operational again, the accumulated write requests in the backup delta queue 223 are transmitted to the primary computer system 110 for execution to bring the primary mass memory device 114 back into synchronization with the backup mass memory device 124.

Thus, synchronization is maintained between the mass storage devices 114, 124 even should the primary computer system 110 shut down before the request REQ is transmitted to the backup computer system 120. Furthermore, only the requests in the backup delta queue 223 need to be transmitted upon the primary computer system 110 becoming operational. Likewise, only the requests in the primary delta queue 213 need to be transmitted upon the backup computer system 120 becoming operational. Thus, complete remirroring of the data after one of the computer systems 110, 120 becomes operational is avoided.

It is noted that the delta queue 213, the delay buffer 214 and memory portion 215 may all be located within the same memory component or may be implemented in separate memory components as desired. Also, the delta queue 223 and the memory portion 225 may also be implemented in the same or different memory component as desired.

The foregoing description relates to a method in which each computer system 110, 120 confirms that the opposite computer system 120, 110 has executed the request by receiving acknowledgement signals ACK2 and ACK3, respectively. However, other confirmation methods are possible.

Figure 4:
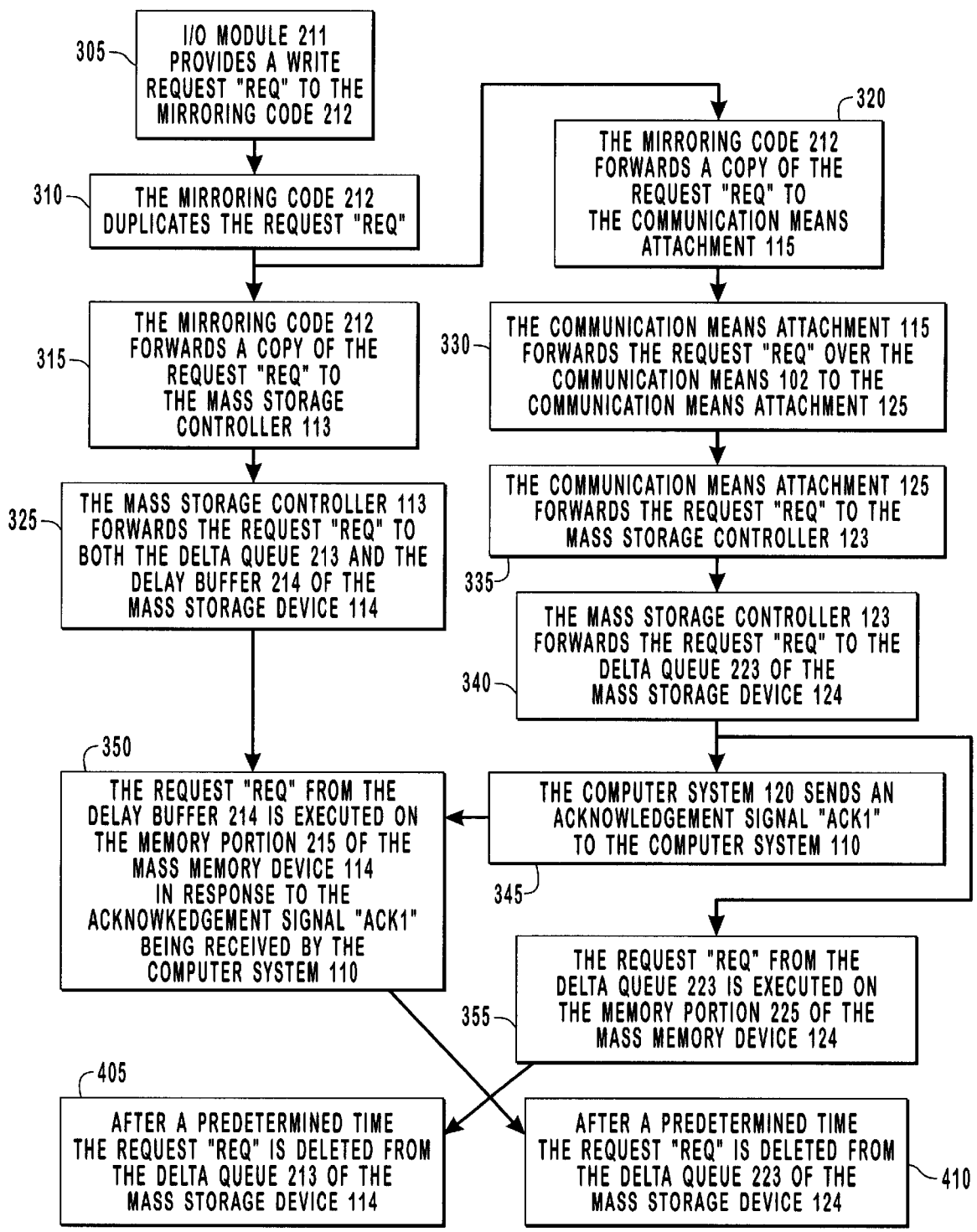
FIG. 4 is a flowchart of an alternative method for synchronizing the primary and backup mass memory devices of FIGS. 1 and 2.

FIG. 4 shows a flow chart of an alternate synchronization method in which acknowledgement signals ACK2 and ACK3 are not used. Steps 305, 310, 315, 320, 325, 330, 335, 340, 345, 350 and 355 are the same in FIG. 4 as they are in FIG. 3. In FIG. 4, the primary computer system 110 waits during a predetermined time period (e.g., five seconds or any other suitable amount of time) after the acknowledgement signal ACK1 is received (step 405). During this time period, if no incident report is received by the primary computer system 110 indicating that the backup computer system 120 has failed, then the primary computer system 110 assumes that the backup computer system 120 executed the request REQ in the backup mass storage device 124. In this case, the primary computer system 110 deletes the request REQ from the primary memory queue 213 after the predetermined time period (also step 405).

Likewise, the backup computer system 120 waits during a predetermined time period after the request REQ is received (step 410). During this time period, if no incident report is received in the backup computer system 120 indicating that the primary computer system 110 has failed, then the backup computer system 120 assumes that the primary computer system 110 executed the request REQ in the primary mass storage device 114. In this case, the backup computer system 120 deletes the request REQ from the backup delta queue 223 after the predetermined time period (also step 410). Thus, confirmation is achieved by assuming that the opposite computer system executed the request if the opposite computer system is still operational after a predetermined time period.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method comprising the steps of:

forwarding a first copy of a write request to a memory buffer associated with a primary computer system so as to result in the primary computer system executing the first copy of the write request in a primary mass memory device associated with the primary computer system only when the primary computer system is so instructed to execute;

forwarding a second copy of the write request to a backup computer system so as to result in the backup computer system executing the second copy of the write request in a backup mass memory device associated with the backup computer system; and informing the primary computer system that the second copy of the write request has been received in the backup computer system so as to result in the primary computer system being instructed to execute the first copy of the write request in the primary mass memory device.

2. The method of claim 1, wherein the step of informing the primary computer system that the second copy of the write request has been received in the backup computer system comprises the steps of:

generating an acknowledgement signal in the backup computer system when the second copy of the write request has been received in the backup computer system; and forwarding the acknowledgement signal to the primary computer system.

3. The method according to claim 2, further comprising the steps of:

forwarding the first copy of the write request to a primary memory queue associated with the primary computer system so as to result in a primary list of write requests accumulating in the primary memory queue, the primary list including write requests that are not yet confirmed to have been executed in the backup computer system;

forwarding the second copy of the write request to a backup memory queue associated with the backup computer system so as to result in a backup list of write requests accumulating in the backup memory queue, the backup list including write requests that are not yet confirmed to have been executed in the primary computer system;

confirming that the second copy of the write request was executed in the backup computer system so as to result in deletion of the first copy of the write request from the primary memory queue; and confirming that the first copy of the write request was executed in the primary computer system so as to result in deletion of the second copy of the write request from the backup memory queue.

4. The method of claim 3, wherein the step of confirming that the second copy of the write request was executed in the backup computer system comprises the steps of:

monitoring the backup computer system by the primary computer system for a predetermined time period after the acknowledgement signal has been received by the primary computer system; and determining, by the primary computer system, that the backup computer system has not failed within the predetermined time period based on the step of monitoring the backup computer system, wherein, when the backup computer system has not failed, the predetermined time period is sufficient to allow execution of the second copy of the write request in the backup computer system.

5. The method of claim 4, wherein the predetermined time period is a first predetermined time period, wherein the step of confirming that the first copy of the write request was executed in the primary computer system comprises the steps of:

monitoring the primary computer system by the backup computer system for a second predetermined time period after the acknowledgement signal has been forwarded to the primary computer system; and determining, by the backup computer system, that the primary computer system has not failed within the second predetermined time period based on the step of monitoring the primary computer system, wherein, when the primary computer system has not failed, the second predetermined time period is sufficient to allow execution of the first copy of the write request in the primary computer system.

6. The method of claim 3, wherein the step of confirming that the first copy of the write request was executed in the primary computer system comprises the steps of:

monitoring the primary computer system by the backup computer system for a predetermined time period after the acknowledgement signal has been forwarded to the primary computer system; and determining, by the backup computer system, that the primary computer system has not failed within the predetermined time period based on the step of monitoring the primary computer system, wherein, when the primary computer system has not failed, the second predetermined time period is sufficient to allow execution of the first copy of the write request in the primary computer system.

7. The method of claim 3, wherein the acknowledgement signal is a first acknowledgement signal, wherein the step of confirming that the first copy of the write request was executed in the primary computer system comprises the steps of:

generating a second acknowledgement signal in the backup computer system when the backup computer system executes the second copy of the write request; and transmitting the second acknowledgement signal to the primary computer system.

8. The method of claim 7, wherein the step of confirming that the second copy of the write request was executed in the backup computer system comprises the steps of:

generating a third acknowledgement signal in the primary computer system when the primary computer system executes the first copy of the write request; and transmitting the third acknowledgement signal to the backup computer system.

9. The method of claim 3, wherein the acknowledgement signal is a first acknowledgement signal, wherein the step of confirming that the second copy of the write request was executed in the backup computer system comprises the steps of:

generating a second acknowledgement signal in the primary computer system when the primary computer system executes the first copy of the write request; and transmitting the second acknowledgement signal to the backup computer system.

10. The method of claim 3, wherein the step of forwarding a first copy of a write request to a memory buffer associated with a primary computer system comprises the step of:

forwarding the first copy of the write request to a first portion of the primary mass memory device.

11. The method of claim 10, wherein the step of forwarding the first copy of the write request to a primary memory queue associated with the primary computer system comprises the step of:

forwarding the first copy of the write request to a second portion of the primary mass memory device.

12. The method of claim 11, wherein the step of forwarding the second copy of the write request to a backup memory queue associated with the backup computer system comprises the step of:

forwarding the second copy of the write request to a portion of the backup mass memory device.

13. The method of claim 1, further comprising the steps of:

accumulating a plurality of write requests in a backup memory queue associated with the backup computer system when the primary computer system is not operational;

executing the plurality of write requests in the backup computer system; and after the primary computer system device becomes operational, transmitting the plurality of write requests from the backup memory queue to the primary computer system for execution at the primary computer system.

14. The method of claim 1, wherein the step of forwarding a first copy of a write request to a memory buffer associated with a primary computer system comprises the step of:

forwarding the first copy of the write request through a mass storage controller to the memory buffer.

15. The method of claim 1, wherein the step of forwarding a second copy of the write request to a backup computer system comprises the step of:

forwarding the second copy of the write request to the backup computer system through a communication means attachment and over a communication means.

16. A machine-readable medium having machine-executable instructions for performing, at a primary computer system, the steps of:

forwarding a first copy of a write request to a memory buffer associated with the primary computer system so as to result in the primary computer system executing the first copy of the write request in a primary mass memory device associated with the primary computer system only when the primary computer is so instructed to execute;

forwarding a second copy of the write request to a backup computer system so as to result in the backup computer system executing the second copy of the write request in a backup mass memory device associated with the backup computer system; and receiving an acknowledgement that the backup computer system has received the second copy of the write request so as to result in the primary computer system being instructed to execute the first copy of the write request in the primary mass memory device.

17. The machine-readable medium of claim 16, wherein the machine-executable instructions are further for performing the steps of:
  forwarding the first copy of the write request to a primary memory queue associated with the primary computer system so as to result in a primary list of write requests accumulating in the primary memory queue, the primary list including write requests that are not yet confirmed to have been executed in the backup computer system; and
  deleting the first copy of the write request from the primary memory queue after determining that the second copy of the write request was executed in the backup computer system.

18. The machine-readable medium of claim 17, wherein the machine-executable instructions are further for determining that the second copy of the write request was executed in the backup computer system performing the steps of:
  monitoring the backup computer system for a predetermined time period after receiving the acknowledgement that the backup computer system has received the second copy of the write request; and
  determining that the backup computer system has not failed within the predetermined time period based on the step of monitoring the backup computer system, wherein, when the backup computer system has not failed, the predetermined time period is sufficient to allow the second copy of the write request to be executed in the backup mass memory device.

19. The machine-readable medium of claim 17, wherein the machine-executable instructions are further for determining that the second copy of the write request was executed in the backup computer system by performing the step of:
  receiving an acknowledgement signal from the backup computer system indicating that the second copy of the write request has been executed in the backup computer system.

20. The machine-readable medium of claim 17, wherein the machine-executable instructions are further for performing the step of:
  accumulating a plurality of write requests in the primary memory queue when the backup computer system is not functional.

21. A machine-readable medium having machine-executable instructions, in a backup computer system, for performing the steps of:
  receiving a write request also forwarded to a memory buffer associated with a primary computer system;
  informing the primary computer system that the write request has been received in the backup computer system; and
  executing the write request in a backup mass memory device associated with the backup computer system.

22. The machine-readable medium of claim 21, wherein the machine-executable instructions for informing the primary computer system that the write request has been received in the backup computer system are for performing the following steps:
  generating an acknowledgment signal when the write request has been received in the backup computer system; and
  forwarding the acknowledgement signal to the primary computer system.

23. The machine-readable medium of claim 22, wherein the machine-executable instructions are further for performing the steps of:
  forwarding the write request to a backup memory queue associated with the backup computer system; and
  determining that the write request has been executed in a primary mass memory device associated with the primary computer system when the write request has been executed in the primary mass memory device.

24. The machine-readable medium of claim 23, wherein the machine-executable instructions are further for performing the step of:
  deleting the write request from the backup memory queue after determining that the write request has been executed in the primary mass memory device.

25. The machine-readable medium of claim 23, wherein the machine-executable instructions for determining that the write request has been executed in a primary mass memory device are for performing the steps of:
  monitoring the primary computer system for a predetermined time period after the primary computer system has been informed that the write request has been received in the backup computer system; and
  determining that the primary computer system has not failed within the predetermined time period based on the step of monitoring, wherein, when the primary computer system has not failed, the predetermined time period is sufficient to allow execution of the write request in the primary mass memory device.

26. The machine-readable medium of claim 23, wherein the machine-executable instructions for determining that the write request has been executed in a primary mass memory device are further for performing the following step:
  receiving an acknowledgement signal generated by the primary computer system when the write request is executed in the primary mass memory device.

27. The machine-readable medium of claim 21, wherein the machine-executable instructions are further for performing the following steps:
  generating an acknowledgement signal when the write request has been executed in the backup mass memory device; and
  transmitting the acknowledgement signal to the primary computer system.

28. The machine-readable medium of claim 21, wherein the machine-executable instructions are further for performing the following steps:
  accumulating a plurality of write requests in a memory queue associated with the backup computer system when the primary computer system is not functional;
  executing the plurality of write requests in the backup mass memory device; and
  forwarding the plurality of write requests to the primary computer system when the primary computer system becomes functional.

29. The machine-readable medium of claim 21, wherein the machine-executable instructions for receiving a write request also forwarded to a memory buffer associated with a primary computer are further for performing the following step:
  receiving the write request over a communication means and by a communication means attachment associated with the backup computer system.

30. A computer network comprising:
  a primary computer system including a computer-readable medium having stored thereon computer-executable instructions for performing the following steps:

forwarding a first copy of a write request to a memory buffer associated with the primary computer system so as to result in the primary computer system executing the first copy of the write request in a primary mass memory device associated with the primary computer system only when the primary computer is so instructed to execute;

forwarding a second copy of the write request to a backup computer system so as to result in the backup computer system executing the second copy of the write request in a backup mass memory device associated with the backup computer system; and receiving an acknowledgement that the backup computer system has received the second copy of the write request so as to result in the primary computer system being instructed to execute the first copy of the write request in the primary mass memory device;

a backup computer system including a computer-readable medium having stored thereon computer-executable instructions for performing the following steps:

receiving a write request also forwarded to a memory buffer associated with a primary computer system;

informing the primary computer system that the write request has been received in the backup computer system; and executing the write request in a backup mass memory device associated with the backup computer system; and a communication means for communicatively interconnecting the primary and backup computer systems.

31. A method comprising the acts of:

generating a write request;

duplicating the write request in a primary computer system using computer-executable mirroring instructions residing in the primary computer system to create a first and second copy of the write request;

forwarding the first copy of the write request to a memory buffer associated with the primary computer system when the primary computer system is operational;

forwarding the second copy of the write request to a backup computer system;

generating an acknowledgement signal at the backup computer system, the acknowledgement signal indicating that the backup computer system has received the second copy of the write request;

transmitting the acknowledgement signal from the backup computer system to the primary computer system over a communication link;

executing the first copy of the write request in a primary mass memory device associated with the primary computer system when the primary computer system is operational and receives the acknowledgement signal; and executing the second copy of the write request in a backup mass memory device associated with the backup computer system.

* * * * *